US006601282B1

(12) United States Patent
Smitterberg et al.

(10) Patent No.: US 6,601,282 B1
(45) Date of Patent: Aug. 5, 2003

(54) METHOD AND APPARATUS FOR POSITIONING AND LOCKING A GLUE ROLL FOR A SINGLE FACER IN OPERATIVE POSITION

(75) Inventors: Dean W. Smitterberg, Phillips, WI (US); Dennis L. Lemke, Phillips, WI (US)

(73) Assignee: Marquip, LLC, Phillips, WI (US)

( * ) Notice: Subject to any disclaimer, the term of this patent is extended or adjusted under 35 U.S.C. 154(b) by 0 days.

(21) Appl. No.: 10/053,219

(22) Filed: Jan. 15, 2002

(51) Int. Cl.[7] .......................... B23D 39/03; B23P 11/00

(52) U.S. Cl. .......................... 29/428; 29/469; 156/356; 156/462; 156/547

(58) Field of Search .......................... 29/428, 434, 469; 156/205, 210, 547, 462, 356

(56) References Cited

U.S. PATENT DOCUMENTS 3,358,485 A 12/1967 De Caro et al.
3,509,815 A 5/1970 Lloyd
4,627,831 A * 12/1986 Hirakawa et al. ........... 493/337
4,629,526 A * 12/1986 Kanda ........................ 156/210
4,764,236 A * 8/1988 Nikkel ........................ 156/210
4,773,963 A * 9/1988 Seki et al. .................. 156/470
5,122,220 A 6/1992 Seiki
5,147,462 A 9/1992 Wollamn
5,150,514 A * 9/1992 Seki et al. .................... 29/824
5,201,586 A 4/1993 Zimmermann et al.
5,348,612 A 9/1994 Buetikofer et al.
5,389,183 A * 2/1995 Seki et al. .................. 156/359
5,401,529 A 3/1995 Wollam
5,415,720 A 5/1995 Schonhammer et al.
5,589,014 A * 12/1996 Hicks ........................ 156/73.1
5,647,947 A * 7/1997 Yasui et al. ................. 156/361
5,656,124 A * 8/1997 Krayenhagen et al. ...... 156/359
5,993,587 A * 11/1999 Seki et al. .................. 156/210
6,238,198 B1 * 5/2001 Hatasa et al. ............... 425/186

FOREIGN PATENT DOCUMENTS

GB 2194974 A * 3/1988 ............. B31F/1/28
GB 2211216 A * 6/1989 ............. B31F/1/20

* cited by examiner

*Primary Examiner*—Gregory Vidovich
*Assistant Examiner*—Essama Omgba
(74) *Attorney, Agent, or Firm*—Andrus, Sceales, Starke & Sawall

(57) ABSTRACT

A glue machine for a corrugator single facer utilizes a system of simultaneously operated linear actuators to move the glue machine from an idle position adjacent the single facer to a locked position on the single facer, and then to a running position with the glue machine glue roll in a pre-established position with respect to a corrugating roll on the single facer. The glue machine is carried on laterally spaced pairs of front wheels and rear wheels mounted on pivot arms. The linear actuators are preferably air cylinders interconnecting front and rear wheel pivot arms to provide sequential glue machine frame movement from the idle to the locked position, followed by movement to the running position.

13 Claims, 4 Drawing Sheets

METHOD AND APPARATUS FOR POSITIONING AND LOCKING A GLUE ROLL FOR A SINGLE FACER IN OPERATIVE POSITION

FIELD OF THE INVENTION

The present invention pertains to a single facer machine for the manufacture of a single face corrugated web and, more particularly, to a method and apparatus for positioning and locking the glue roll of a separate glue machine with respect to a corrugating roll on the single facer.

BACKGROUND OF THE INVENTION

In the manufacture of corrugated paperboard, a single facer machine is used to corrugate the medium web, apply glue to the flute tips on one face of the corrugated medium web, and bring a liner web into contact with the glued flute tips of the medium web while applying sufficient heat and pressure to provide an initial bond in the glue lines between the corrugated medium and the liner. For many years, single facers have typically included a pair of fluted corrugating rolls and pressure roll which are aligned so that the axes of all three rolls are generally coplanar. The medium web is fed into a corrugating nip formed by the interengaging corrugating rolls and, while the corrugated medium web is still on one of the corrugating rolls, adhesive is applied to the flute tips by a glue roll. The liner web is immediately thereafter brought into contact with the adhesive-coated flute tips of the medium web and the composite single face web then passes through the nip formed by the corrugating roll and the pressure roll. More recently, a significantly improved single facer machine has been developed in which the corrugating rolls comprise a large diameter heated bonding roll and a substantially smaller diameter corrugating roll, with the ratio of diameters being 3:1 or greater. This more recently developed single facer eliminates the need for a pressure roll.

In both the older style single facer, where the corrugating rolls are of approximately the same diameter, and the more recently developed single facer, where the large diameter fluted bonding roll cooperates with the small diameter fluted corrugating roll, glue that typically comprises a starch adhesive is applied to the flute tips of the corrugated medium web while the web is held on a corrugating roll by the use of a glue application roll. Typically, glue from a reservoir is applied to a doctor roll which in turn transfers a layer of adhesive to the glue roll which is spaced a very small distance from the corrugated medium being carried on one of the corrugating rolls. It is important to carefully control the glue roll gap to assure that a uniform and proper amount of glue is transferred to the flute tips of the medium web.

In modern single facers, it is typical to mount the entire glue machine on a separate and independent frame and to mount the remainder of the single facer apparatus on a main single facer frame. The single facer main frame is set in a fixed position and the glue machine is mounted to move from an operative position with respect to the single facer machine to a spaced position a substantial distance from the single facer. To accommodate this movement, the glue machine is typically mounted on wheels in a manner to permit it to be moved far enough away from the single facer main frame to permit access to both the single facer and the glue machine for maintenance, cleaning and repair. In accordance with the subject invention, an apparatus is disclosed for positioning and locking the glue roll on the glue machine and moving the glue roll into operative running position with respect to a corrugating roll on the single facer machine.

SUMMARY OF THE INVENTION

In accordance with the present invention, the glue machine frame is provided with a pair of laterally spaced front wheels that are attached to and support the frame on a rotatable front pivot arm. A pair of laterally spaced rear wheels are attached to and support the glue machine frame on a rotatable rear pivot arm. An actuator device connects the front and rear pivot arms and is operable to initially rotate the front pivot arm to move the front wheels from an idle position supporting the front of the glue machine frame on a horizontal support surface to a locked position with the front wheels lifted from the horizontal surface and the front of the glue machine frame lowered vertically into a pivotal position on laterally spaced support blocks on the glue machine frame. The actuator device is operable thereafter to rotate the rear pivot arm and move the rear wheels over the horizontal surface and to rotate the glue machine frame about the axis of the support blocks from the locked position to a running position defined by a glue machine frame abutment surface in contact with a single facer machine abutment surface.

In accordance with a preferred embodiment, each of the laterally spaced front and rear wheels is attached to the machine frame on a respective rotatable front and rear pivot arm. The actuator device comprises a linear fluid actuator that interconnects a front pivot arm and a rear pivot arm on each lateral side of the glue machine frame. The actuators are operable in unison to move from an extended position that establishes the idle position of the machine to an intermediate position that establishes the locked position, and then to a fully retracted position that establishes the running position. Preferably, each front wheel and each rear wheel is supported, respectively, by a pair of front pivot arms and a pair of rear pivot arms with each pair of arms rotatably supported on a wheel mounting shaft on opposite sides of its respective wheel, and the linear fluid actuators are pairs of air cylinders connecting each front and rear wheel pair. The apparatus also includes a front wheel stop on the glue machine that limits rotation of the front wheel on the front pivot arm in the direction of the locked position and sets said locked position. The apparatus also includes a rear pivot arm stop that is attached to the glue machine frame and limits rotation of the rear pivot arm in the direction of the extended position of the actuator establishing the idle position of the glue machine frame.

In the preferred embodiment, the support blocks comprise a pair of V-blocks, and the glue machine is provided with a pair of laterally spaced rollers that are aligned with the V-blocks in spaced relation thereto in the idle position and which move into bearing contact with the V-blocks in the locked position. In the preferred embodiment, the single facer machine abutment surface comprises a pair of stop blocks attached to the single facer frame, and the glue machine abutment surface comprises a pair of cam followers attached to the glue machine frame. The attachment of each cam follower to the glue machine frame is adjustable to vary the operative position of the glue roll in the running position. The glue machine is movable on the front and rear wheels over the horizontal support surface from the idle position to a service position in which the machine is spaced from the single facer machine.

Further in accordance with the present invention, a method for positioning and locking the glue roll of a glue machine and for moving the glue roll into operative position with respect to the corrugating roll of a single facer machine includes the steps of (1) supporting the glue machine on pairs of laterally spaced front wheels and rear wheels that are attached to the glue machine frame by respective pairs of rotatable front and rear pivot arms, (2) connecting the front and rear pivot arms with a linear actuator, (3) operating the actuator to initially rotate the front pivot arms and to move the front wheels from an idle position supporting the front of the glue machine frame on a horizontal surface to a locked position with the front wheels lifted from the horizontal surface and the front of the glue machine frame lowered vertically onto laterally spaced support blocks on the single facer machine frame, and (4) continuing operating the actuator to rotate the rear pivot arms and to move the rear wheels over the horizontal surface thereby rotating the glue machine on the support blocks from the locked position to a running position with a glue machine frame abutment surface in contact with a single facer machine abutment surface.

In accordance with the preferred method, the linear actuator comprises a fluid cylinder connecting a front pivot arm and a rear pivot arm on each lateral side of the glue machine frame, and the operating steps comprise (1) retracting the cylinders in unison from an extended position establishing the idle position to an intermediate position establishing the locked position, and (2) continuing retracting the cylinders to a retracted position establishing the running position. Most preferably, the fluid cylinders comprise air cylinders, and the method further includes steps of (1) positioning a front pivot arm stop on the glue machine frame in the path of front pivot arm rotation in the retracting direction to prevent rotation thereof past the locked position, and (2) positioning a rear pivot arm stop on the glue machine frame in the path of rear pivot arm rotation in the extending direction to prevent rotation thereof past the idle position.

In the preferred embodiment, the single facer abutment surface comprises a stop block attached to the single facer machine frame and the glue machine abutment surface comprises a cam follower attached to the glue machine frame, and the method comprises the additional step of adjusting the position of the cam follower to vary the operative position of the glue roll in the running position.

DETAILED DESCRIPTION OF THE PREFERRED EMBODIMENT

Figure 1:
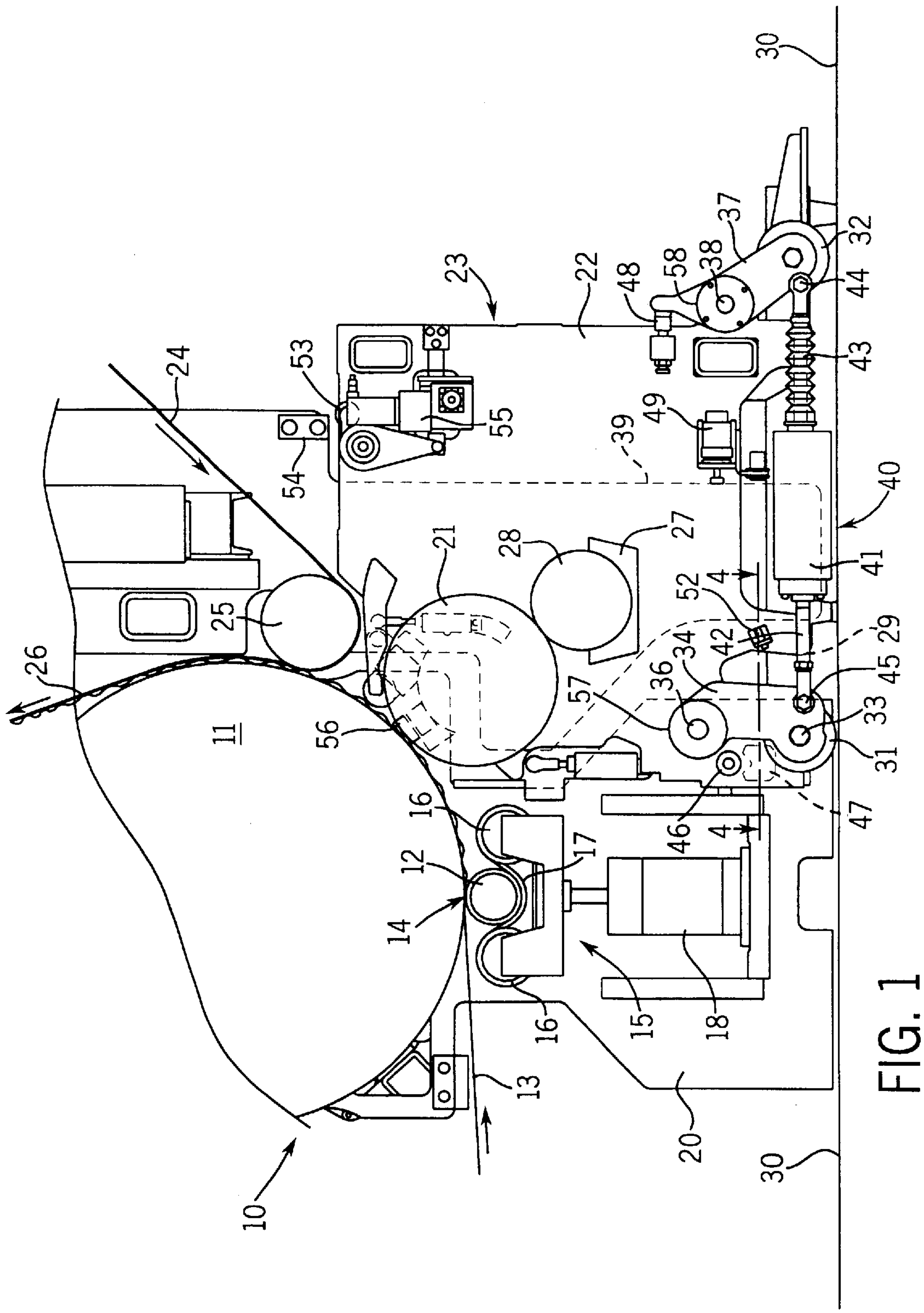
FIGS. 1–3 are similar side elevation views of a single facer machine and an associated glue machine incorporating the glue roll locking and positioning apparatus of the present invention.

In FIG. 1, a single facer machine 10 includes a large diameter upper corrugating roll 11, hereinafter also referred to as a bonding roll 11, and a much smaller diameter lower corrugating roll 12. Both rolls 11 and 12 are fluted and mounted for interengaging rotational movement on parallel axes, all in a manner well known in the art. A medium web 13, which is typically pretreated by moistening and heating, is fed into a corrugating nip 14 formed by the interengaging corrugating rolls 11 and 12. The small diameter corrugating roll 12 is held in nipping engagement with the bonding roll 11 by a variable force backing arrangement 15. The backing arrangement includes a series of axially adjacent pairs of backing rolls 16, each of which pairs has a pressure or back-up belt 17 entrained therearound. Each of the back-up belts 17 is positioned to bear directly against the fluted outer surface of the small diameter corrugating roll 12. Each pair of backing rolls 16 and its respective back-up belt 17 is mounted on a linear actuator 18. By individually controlled operation of each linear actuator 18, the back-up belts 17 may be made to engage the small diameter corrugating roll with a selectively adjustable force. The bonding roll 11, small diameter lower corrugating roll 12 and the backing arrangement 15 are all mounted on and carried by a single facer machine main frame 20.

As the corrugated medium web 13 leaves the corrugating nip 14, it remains on the surface of the large diameter bonding roll 11. Immediately downstream from the nip 14, a glue roll 21, carried on the main frame 22 of a glue machine 23, applies a liquid adhesive, typically starch, to the exposed flute tips of the corrugated medium web 13. Immediately thereafter, a liner web 24 is brought into contact with the glued flute tips of the corrugated medium web by a liner delivery roll 25 (sometimes referred to as a generator roll), also carried on the single facer main frame 20. The resulting freshly glued single face web 26 continues around a portion of the outer circumference of the large diameter bonding roll 11 which is internally heated, for example with steam, to cause the starch adhesive to be initially gelatinize and then enter the so-called "green bond" stage.

It is critically important for the strength and integrity of the single face web 26 that the glue, which is applied to the flute tips of the corrugated medium web 13 along the full length of the flutes, be applied in carefully metered amounts. The starch-based adhesive glue is supplied from a glue reservoir 27 mounted on the glue machine frame 22 and from which glue is initially taken up by a doctor roll 28 running in the reservoir. The doctor roll 28, in turn, applies a carefully controlled layer of glue to the surface of the counterrotating glue roll 21. The glue roll is set in an operative position with respect to the corrugated medium web 13 on the bonding roll 11 so that the glue is applied in carefully controlled amounts to the flute tips in glue lines that extend the full length of the flutes.

The glue machine 23 is designed to be moved into a cooperative position adjacent the single facer 10, the glue machine frame 22 locked to the single facer frame 20, and then moved slightly to a final operative running position with the glue roll 21 set at a predetermined distance from the bonding roll 11 carrying the medium web 13. It is also known in the art to monitor the glue roll gap during operation and to adjust the position of the glue roll, if necessary, to maintain the proper gap where, for example, thermal expansion or the like results in a change in the gap during operation. It is also desirable to completely disconnect the glue machine from the single facer machine so the two can be completely separated to permit cleaning, maintenance, and repair. To accommodate all of the foregoing, the single facer frame 20 is typically bolted or otherwise fixed to the floor or other horizontal support surface 30, whereas the glue machine 23 is mounted on wheels to accommodate positioning, adjustment and movement to and away from the single facer.

Figure 2:
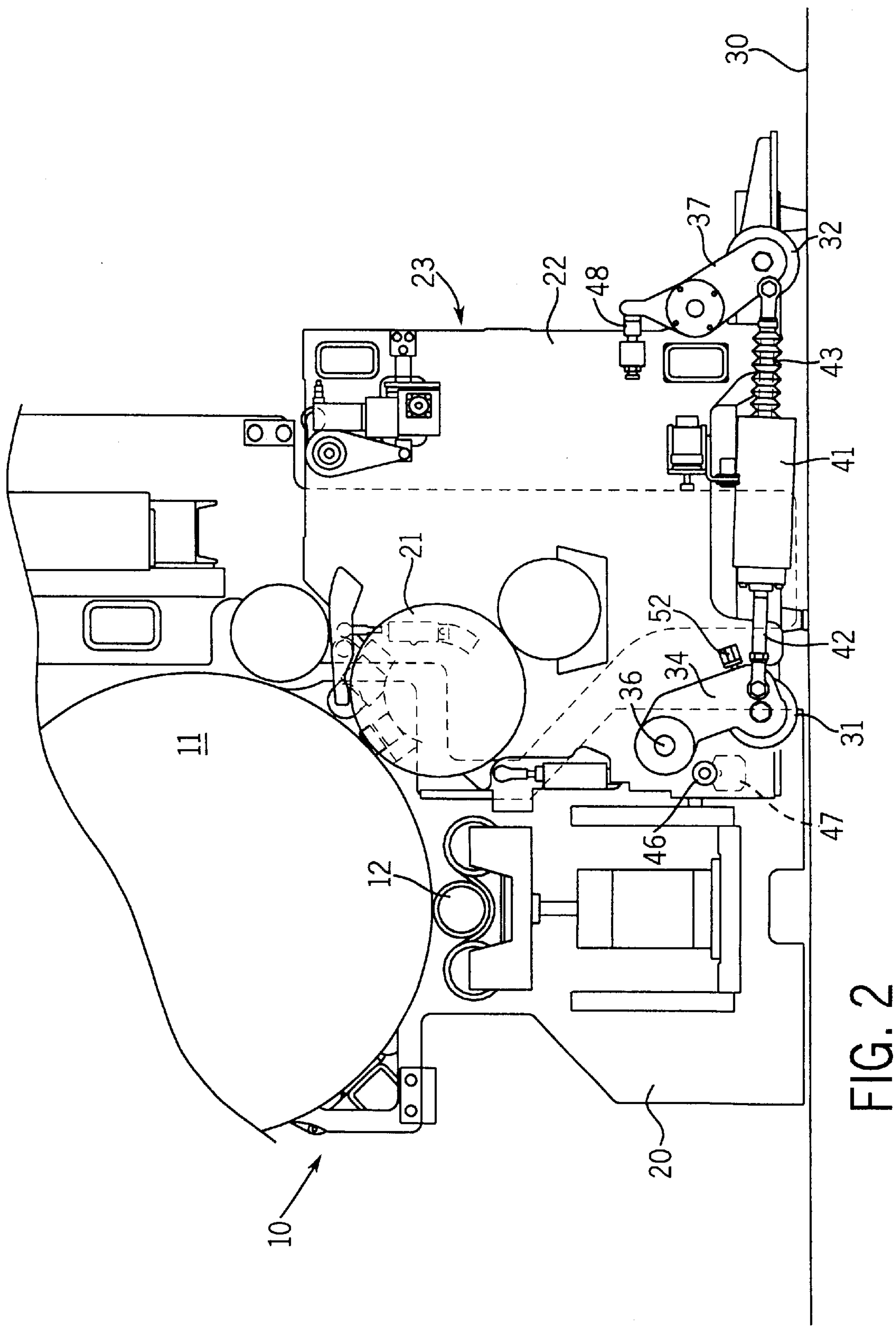
Figure 3:
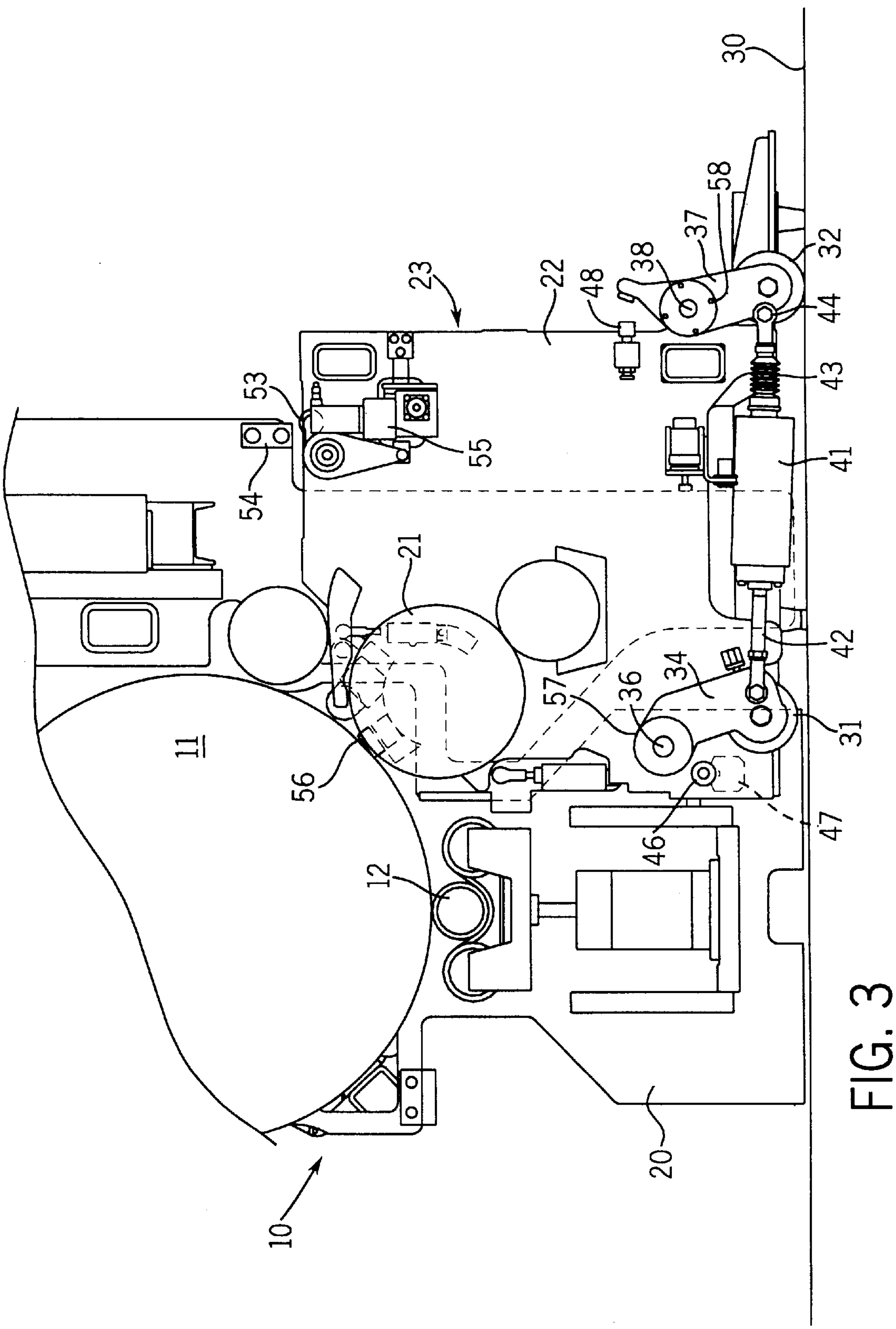
Figure 4:
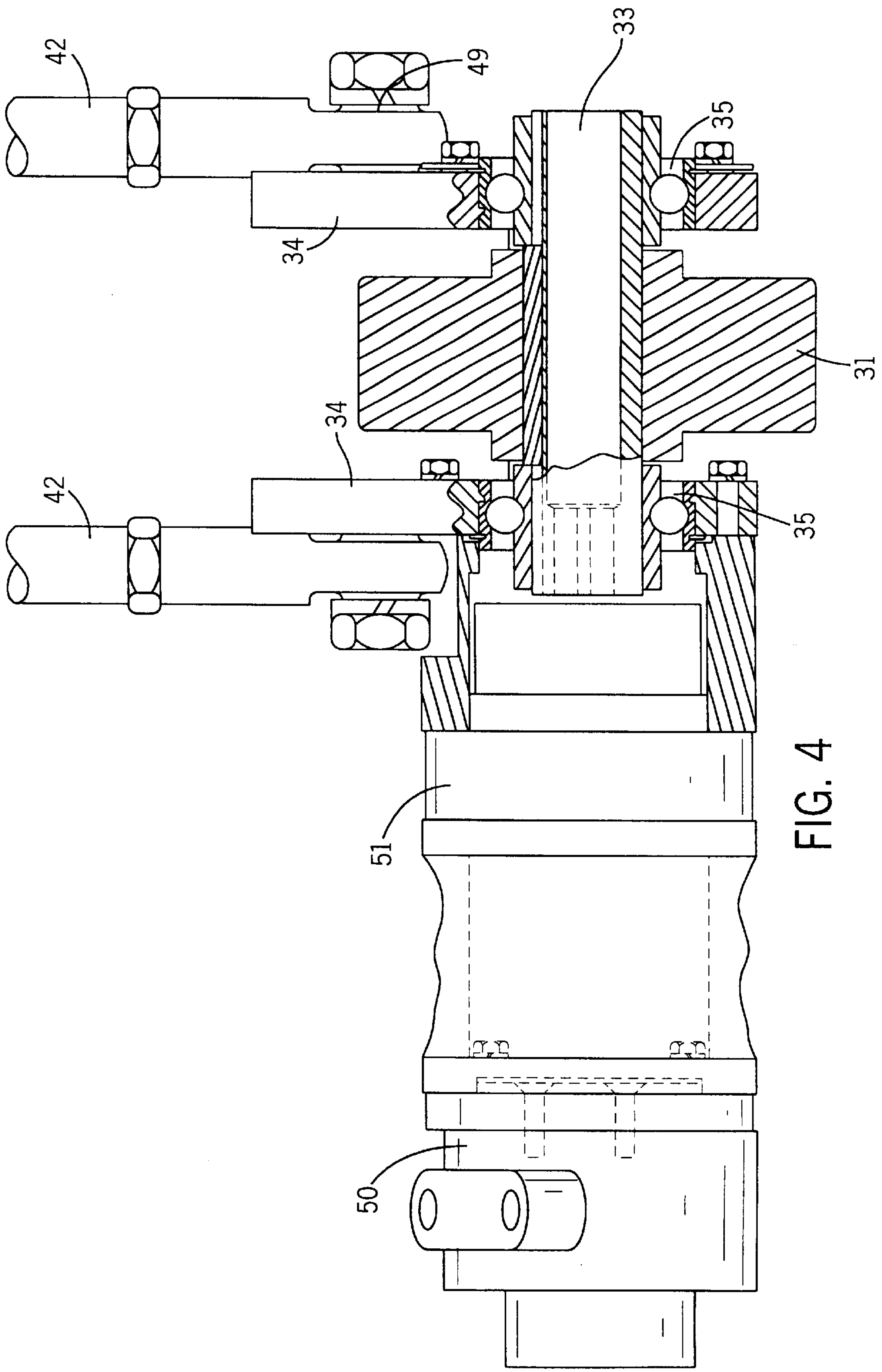
FIG. 4 is an enlarged top plan view detail taken on line 4—4 of FIG. 1.

Referring also to FIGS. 2–4, the glue machine frame 22 is supported for rolling movement over the support surface 30 by a pair of laterally spaced front wheels 31 and a pair of similarly laterally spaced rear wheels 32. Each front wheel 31 is mounted on and fixed to a wheel mounting shaft 33 for rotation therewith. The opposite axial ends of each wheel mounting shaft 33 are rotatably mounted on a pair of front pivot arms 34 via wheel bearings 35, as best seen in FIG. 4. The opposite upper ends of each of the front pivot arms 34 are pivotally attached to the glue machine frame 22 on a common front pivot 36. Each of the rear wheels 32 is similarly mounted between the lower ends of a pair of rear pivot arms 37. The opposite upper ends of the rear pivot arms 37 are pivotally attached to the glue machine frame 22 on a common rear pivot 38.

Each aligned pair of a front pivot arm 34 and rear pivot arm 37 is interconnected with a linear actuator 40, preferably comprising an air cylinder 41. The front end of each cylinder includes a mounting shaft 42 that is pivotally attached via a pivot 45 to the lower end of the front pivot arm 34 near the front wheel 31. The retractable and extendable cylinder rod 43 on the opposite end of the air cylinder 41 is connected by a rod end pivot 44 to the lower end of the rear pivot arm 37 adjacent the rear wheel 32. Thus, referring particularly to FIG. 4, each of the pair of laterally spaced front wheels 31 is rotatably carried on the lower end of a pair of ago front pivot arms 34 which are, in turn, mounted to the glue machine frame 22 on a common front pivot 36. Each of the pair of laterally spaced rear wheels 32 is similarly mounted as indicated above. The front and rear wheels are thus interconnected by four identical air cylinders 41 which serve to move the wheels from an idle position (FIG. 1) supporting the glue machine 23 for rolling movement over the horizontal support surface 30, to an intermediate locked position (FIG. 2) attached to the single facer main frame 20, and to a running position (FIG. 3) with the glue roll 21 operatively positioned with respect to the bonding roll 11 of the single facer (all as will be described in greater detail hereinafter).

Preferably, the front pivot arms 34 on both sides of the glue machine are interconnected with a torque tube 57. Similarly, the rear pivot arms 37 on opposite sides of the machine are connected by a rear torque tube 58. The torque tubes 57 and 58 maintain a necessary rigidity between the actuator systems on opposite sides of the machine, not allowing any loss of synchronization between the actuating cylinders 41 that could impart excessive movement to one side of the glue machine and not the other. Within the range of some small amount of movement in the couplings by which the torque tubes 57 and 58 are connected to the respective pivot arms 34 and 37, the torque tubes cause the pivot arms on both sides of the machine to operate in unison.

Referring again to FIG. 1, the glue machine 23 has been moved to the idle position where it is supported immediately adjacent the single facer 10 on the front and rear wheels 31 and 32. The idle position is established by contact between a pair of snubbers 49 mounted on opposite sides of the glue machine frame engaging vertical rear edges 39 of the single facer frame. In this position, a pair of laterally spaced cam followers 46, rotatably attached to the glue machine frame 22, are positioned directly above but spaced from a pair of V-block supports 47 secured to the single facer frame 20. In the idle position, the rods 43 of the air cylinders 41 are fully extended and the lower ends of the rear pivot arms 37 are in their rearmost position with the upper ends thereof in contact with a pair of rear pivot arm stops 48. The front wheels 31 are positioned slightly forward of and vertically below the front pivots 36. This establishes an over dead center position in which the glue machine will remain locked if cylinder air pressure is accidentally lost. From the idle position of FIG. 1, the glue machine 23 may be rolled over the floor 30 away from the single facer frame to completely separate the glue machine from the single facer to provide space for cleaning, maintenance, or repair. Preferably, however, and referring again to FIG. 4, each front wheel 31 is driven by an air motor 50 mounted directly on the axial inner end of the wheel mounting shaft 33. Each air motor 50 includes a reducer 51, the output shaft of which is keyed directly to the wheel mounting shaft 33. The glue machine may thus be driven to or from the FIG. 1 position.

FIG. 2 shows movement of the glue machine 23 from the idle position to a locked position on the single facer main frame 20. As the cylinder rods 43 of the air cylinders 41 are caused to retract in unison, the front pivot arms 34 will rotate in a rearward direction (counterclockwise) about their respective front pivots 36. As the front wheels 31 pivot rearwardly in circular arcs on the front pivot arms 34, the entire front end of the glue machine 23 will drop slightly until the cam followers 46 drop into the V-block supports 47. As the cylinders 41 continue to retract, the glue machine will rotate about the common axis of the spaced cam followers 46 and the front wheels 31 will lift off the floor 30 until the front wheels engage respective front stop edges 29 on opposite sides of the glue machine frame 22. As the front pivot arms 34 approach respective position sensors 52 on the glue machine frame 22 signals are generated to indicate that the front wheels 31 are fully retracted. At this point shown in FIG. 2, the front of the glue machine is fully supported and locked as a result of the mass of the glue machine in the V-block supports on the single facer frame and the front wheels 31 are completely off the ground. The foregoing movement occurs first, in preference to rotation of the rear pivot arms 37, because the force required to lift the rear of the glue machine, as will be discussed, is several times the force required to rotate the front pivot arms 34 and drop the front of the machine into the support blocks 47.

In FIG. 3, it can be seen that continued retraction of the air cylinder rods 43 will next cause the rear pivot arms 37 to move forwardly in clockwise rotation about the rear pivots 38. In the locked position of FIG. 2, the rear pivot arms 37 extend downwardly and rearwardly from the rear pivots 38 such that continued retraction of the air cylinder rods 43 causes the upper ends of the rear pivot arms 37 to move away from the rear pivot arm stops 48 and the rear wheels 32 to move under the rear pivots 38, thereby causing the rear of the glue machine 23 to be raised. This upward movement of the rear of the glue machine comprises pivotal rotation of the rear of the machine about the common axis of the cam followers 46 locked in the V-block supports 47. Upward rotation of the rear of the glue machine is halted by engagement between a pair of laterally spaced cam followers 53 on the upper edge of the glue machine frame 22 and a pair of stop blocks 54 on the single facer frame 20. Contact between the cam followers 53 and the respective stop blocks 54 establishes the running position of the glue machine by fixing the gap between the glue roll 21 and the bonding roll 11. If for any reason, the arrangement of the stop blocks 54 and cooperating cam followers is inoperative, a safety stop is provided by contact between the rear wheels 32 and the rear edge of the glue machine frame 22.

Each of the cam followers 53 is mounted for independent adjustment on an adjustment mechanism 55. Preferably, each adjustment mechanism 55 operates independently and in response to signals generated by a gap sensor 56 mounted on each side of the glue machine frame 22 in a position to continuously monitor the actual glue roll gap and to adjust the same as a result of changing dimensions caused, for example, by thermal expansion during machine operation.

When it is desired to unlock the glue machine from the single facer, the process described above is simply reversed. Extension of the cylinder rods 43 of the air cylinders 41 initially causes rearward rotation of the rear pivot arms 37 that in turn causes rotation of the glue machine about the axis of the cam wheels 46 in the V-block supports 47, whereupon the cam followers 53 drop out of contact with the stop blocks 54 until the upper ends of the rear pivot arms 37 again engage the rear pivot arm stops 48 (FIG. 2). Thereafter, continued extension of the cylinders 41 causes the front pivot arms 34 to move forwardly (clockwise rotation about the front pivots 36), causing the front wheels 31 to engage horizontal support surface 30 and lift the front of the glue machine vertically, causing the cam wheels 46 to disengage from the V-block supports 47 (FIG. 1). From this idle position of the glue machine, operation of the air motors 50 will drive the glue machine out from under the single facer main frame 20 to open the space therebetween for maintenance, repair or the like. The movement of the glue machine from an idle position to a locked position, and then to a running position, utilizing a single set of linear actuators provides economies of operation as well as machine construction.

We claim:

1. An apparatus for positioning and locking a glue roll supported on the frame of the glue machine and moving the glue roll into operative position with respect to a corrugating roll supported on the frame of a single facer machine, said apparatus comprising:

a pair of laterally spaced front wheels attached to and supporting the glue machine frame on a rotatable front pivot arm;

a pair of laterally spaced rear wheels attached to and supporting the glue machine frame on a rotatable rear pivot arm; and, an actuator device connecting said front and rear pivot arms and operable to initially rotate the front pivot arm to move the front wheels from an idle position supporting the front of the glue machine frame on a horizontal support surface to a locked position with the front wheels lifted from the horizontal surface and the front of the glue machine frame lowered vertically into a pivotal position on laterally spaced supports defining a common axis on the single facer machine frame and the glue machine frame and, said actuator device operable thereafter to rotate the rear pivot arm and move the rear wheels over the horizontal surface to rotate the glue machine frame about the axis of the supports from the locked position to a running position defined by a glue machine frame abutment surface in contact with a single facer machine abutment surface.

2. The apparatus for positioning and locking a glue roll in claim 1 wherein said actuator device comprises:

a linear fluid actuator interconnecting a front pivot arm and a rear pivot arm on each lateral side of the glue machine frame;

said actuator operable in unison to move from an extended position establishing the idle position to an intermediate position establishing the locked position, and then to a retracted position establishing the running position.

3. The apparatus for positioning and locking a glue roll in claim 2 wherein each front wheel and each rear wheel is supported by a respective pair of front pivot arms and rear pivot arms, each pair of arms rotatably supported on a wheel mounting shaft on opposite sides of a wheel, and said linear fluid actuators comprise two air cylinders connecting each front and rear wheel pair.

4. The apparatus for positioning and locking a glue roll in claim 2 including a front wheel stop on the glue machine frame to limit rotation of the front wheels on said front pivot arm in the direction of the locked position.

5. The apparatus for positioning and locking a glue roll in claim 2 including a rear pivot arm stop attached to the glue machine frame to limit rotation of said rear pivot arm in the direction of the extended position and to set the idle position of the glue machine frame.

6. The apparatus for positioning and locking a glue roll in claim 1 wherein the supports comprise a pair of V-blocks on the single facer machine frame, and further including a pair of laterally spaced rollers mounted on the glue machine frame on said pivotal axis, said rollers aligned with the V-blocks in spaced relation thereto in the idle position and in bearing contact therewith in the locked position.

7. The apparatus for positioning and locking a glue roll in claim 1 wherein said single facer machine abutment surface comprises a stop block attached to the single facer machine frame, and said glue machine abutment surface comprises a cam follower attached to the glue machine frame.

8. The apparatus for positioning and locking a glue roll in claim 7 wherein the attachment of the cam follower to the glue machine frame is adjustable to vary the running position of the glue roll in the running position.

9. The apparatus for positioning and locking a glue roll in claim 1 wherein the glue machine is movable on the front and rear wheels over the horizontal support surface from the idle position to a service position spaced from the single facer machine.

10. A method for positioning and locking a glue roll supported on the frame of a glue machine and for moving the glue roll into operative position with respect to a corrugating roll supported on the frame of a single facer machine, said method comprising the steps of:

(1) supporting the glue machine on pairs of laterally spaced front wheels and rear wheels attached to the glue machine frame by respective pairs of rotatable front and rear pivot arms;

(2) connecting the front and rear pivot arms with a linear actuator;

(3) operating the actuator to initially rotate the front pivot arms and move the front wheels from an idle position supporting the front of the glue machine frame on a horizontal surface to a locked position with the front wheels lifted from the horizontal surface and the front of the glue machine frame lowered vertically onto laterally spaced support blocks on the single facer machine frame; and, (4) continuing operating the actuator to rotate the rear pivot arms and move the rear wheels over the horizontal surface to rotate the glue machine on the support blocks from the locked position to a running position with a glue machine frame abutment surface in contact with a single facer machine abutment surface.

11. The method as set forth in claim 10 wherein said linear actuator comprises a fluid cylinder connecting a front pivot arm and a rear pivot arm on each lateral side of the glue machine frame, and said operating steps comprise:

(1) retracting the cylinders in unison from an extended position establishing the idle position to an intermediate position establishing the locked position; and, (2) continuing retracting the cylinder to a retracted position establishing the running position.

12. The method as set forth in claim 11 wherein said fluid cylinders comprise air cylinders, and including the steps of:

(1) positioning a front stop edge on the glue machine frame in the path of the front wheels moving with front pivot arm rotation in the retracting direction to prevent rotation of the wheels past the locked position; and, (2) positioning a rear pivot arm stop on the glue machine frame in the path of rear pivot arm rotation in the extending direction to prevent rotation thereof past the idle position.

13. The method as set forth in claim 10 wherein said single facer abutment surface comprises a stop block attached to the single facer machine frame and said glue machine abutment surface comprises a cam follower attached to the glue machine frame, and comprising the additional step of adjusting the position of the cam follower to vary the operative position of the glue roll in the running position.

* * * * *